United States Patent [19]
Gordon

[11] Patent Number: 5,254,384
[45] Date of Patent: Oct. 19, 1993

[54] HEATABLE CAR FOOT MAT

[76] Inventor: Winston L. Gordon, 72, Risdon Crt., Etobicoke Ont., Canada, M9C-4E7

[21] Appl. No.: 686,745

[22] Filed: Apr. 16, 1991

Related U.S. Application Data

[63] Continuation of PCT/CA90/00242, Jul. 30, 1990.

[30] Foreign Application Priority Data

Aug. 22, 1989 [CA] Canada ................................ 609765

[51] Int. Cl.⁵ ........................... B32B 3/08; B32B 3/10; B32B 1/06
[52] U.S. Cl. ..................................... 428/71; 428/120; 428/95; 428/138; 428/188; 296/97.23
[58] Field of Search ...................... 428/81, 82, 95, 120, 428/138, 71, 188; 98/2.05; 296/97.23; 15/215, 216, 217

[56] References Cited

U.S. PATENT DOCUMENTS

| | | | |
|---|---|---|---|
| 2,810,672 | 10/1957 | Taylor | 428/33 |
| 3,284,836 | 11/1966 | Ioppolo | 165/41 |
| 3,578,738 | 5/1971 | Hughes | 15/215 |
| 3,605,166 | 9/1971 | Chen | 296/97.23 |

Primary Examiner—Alexander S. Thomas
Attorney, Agent, or Firm—Nixon & Vanderhye

[57] ABSTRACT

A floor mat for a motor vehicle includes a perforated upper mat; a reservoir having a first chamber to underlie the feet of an operator and a second chamber to underlie the pedals of the motor vehicle, the first chamber having a floor and a perimeter ridge with a front wall, two side walls and a rear wall, the second chamber having a floor, two side walls and a front wall, a rear portion of the floor of the second chamber being joined along the top of the front wall of the first chamber to flex upwardly and forwardly of the first chamber and to drain into the first chamber. A plurality of first pedestals are spaced apart on the floor of the first chamber and a plurality of second pedestals are spaced apart on the floor of the second chamber to support the upper mat above the first and second chambers of the reservoir. An air duct extends beneath the floor of the second chamber and communicates with the first chamber through a port in the front wall of the first chamber, with the air duct connected to a heater vent of the motor vehicle to supply warm air to the first chamber.

2 Claims, 3 Drawing Sheets

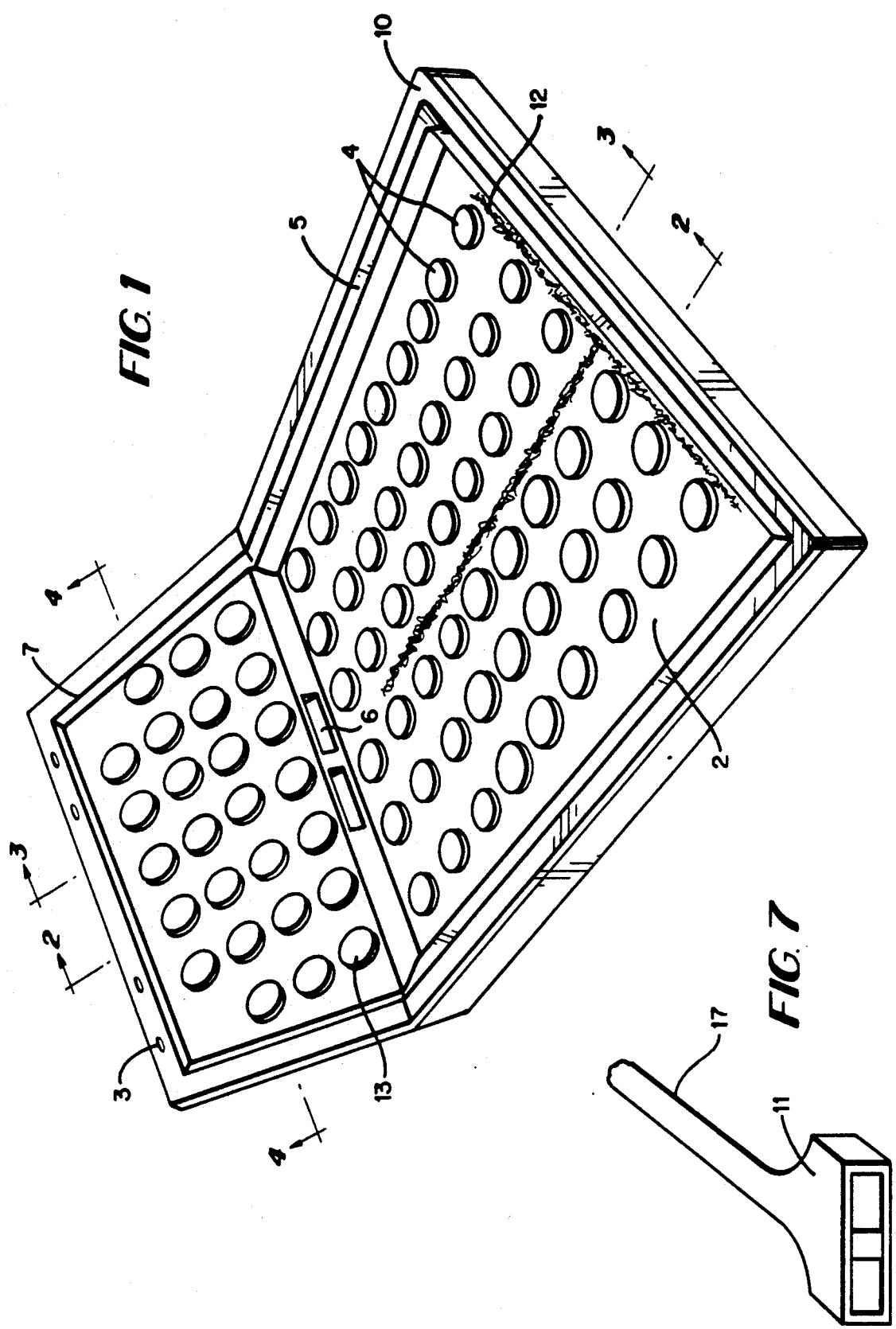

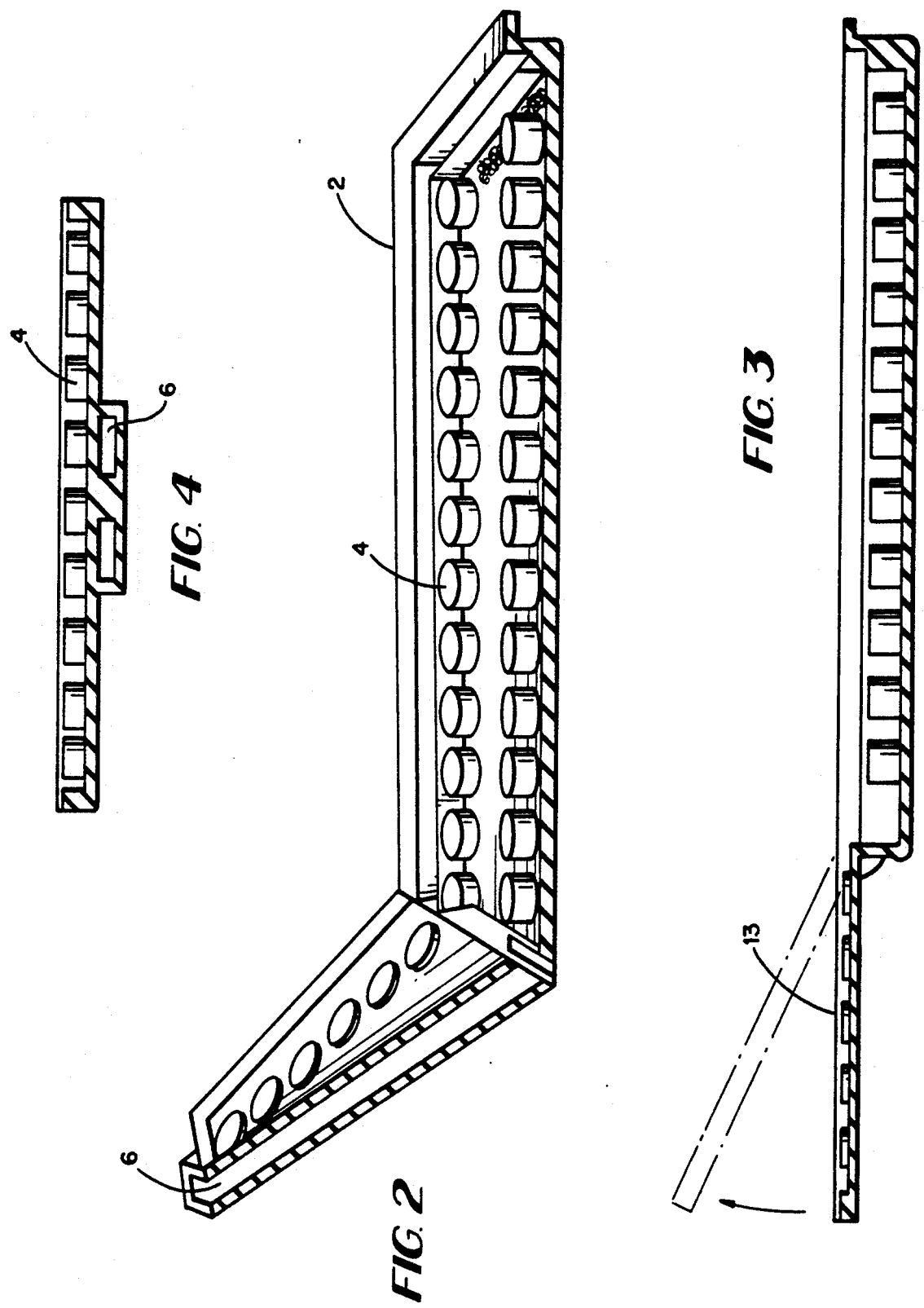

FIG. 5
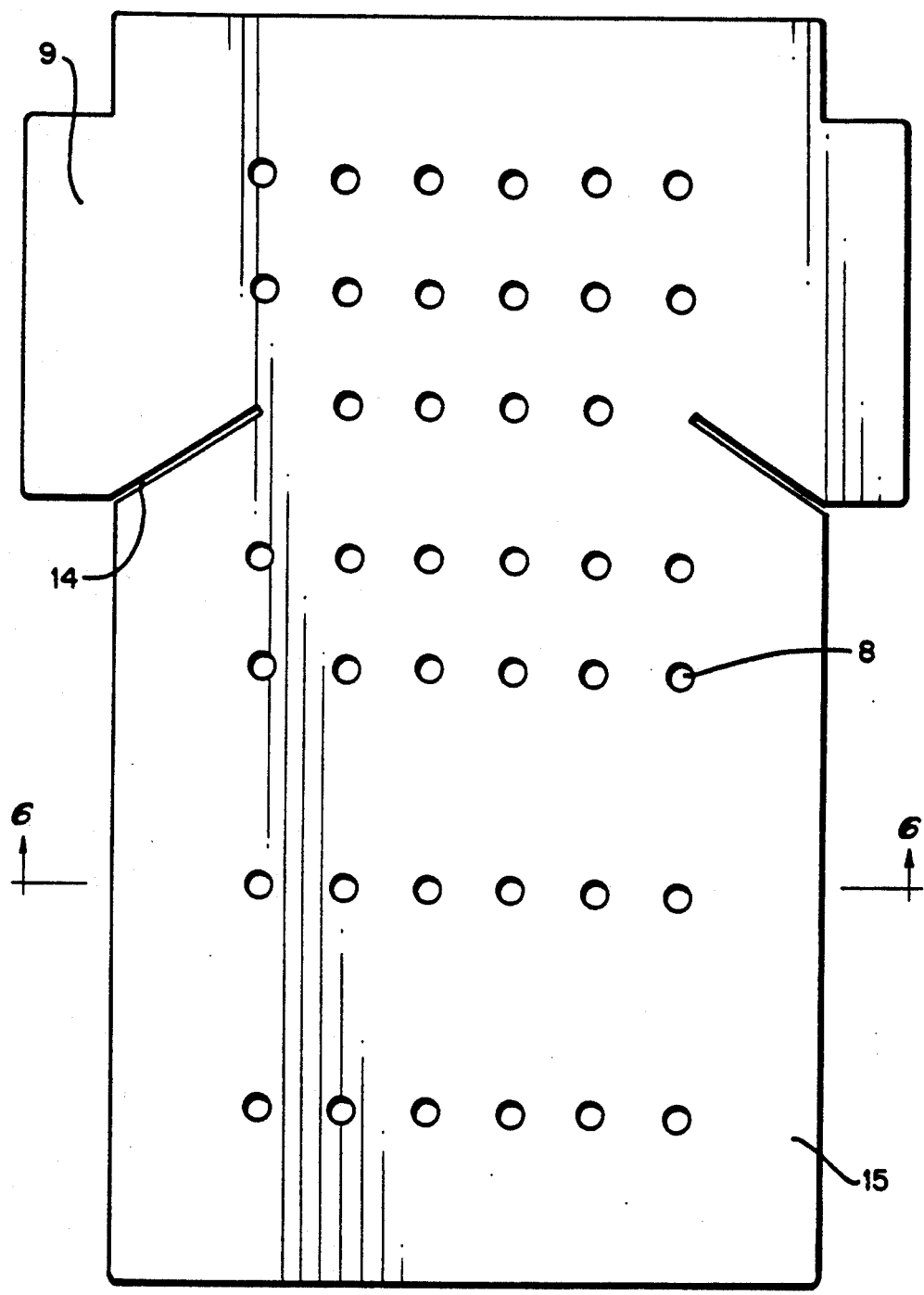
FIG. 6

HEATABLE CAR FOOT MAT

This application is a continuation of PCT/CA90/00242 filed Jul. 30, 1990.

TECHNICAL FIELD

This invention relates to the technical field involved in the manufacture of floor mats for motor vehicles to protect the floors and carpets of such vehicles against foot borne water, snow and road salts.

BACKGROUND ART

During Fall, Winter, and Spring months, snow, water, mud, and road salts are carried on shoes and boots into vehicles causing extensive damage to those areas where there is foot traffic. In order to reduce this problem, floor mats of various types have been developed to protect floors and carpets. Such floor mats have become well known in the prior art. They are commonly designed to fit to the dimensions of a particular type of car and are commonly fabricated of rubber, plastic, fibrous or combinations of such materials. The known mats are very similar functionally. One type of mat is merely a flat sheet of material adapted to cover the carpet in areas of heavy traffic. Other types may contain vertical baffles to trap water and dirt and to prevent one's pant cuff from dipping into the water. However, in all types known to the inventor, there is no means for drying out the mat or for separating the water runoff from the operator's feet while the vehicle is being operated. There are also a number of disadvantages to the known mats, even those which provide baffles to hold water. Each time a person gets into a car more water in tracked into the car. If an operator gets into and out of his car many times on a wet day, water may accumulate to the point of overflow. Moreover, vehicle motion may cause water trapped in the baffles of the known mats to spill. Damage may result from overflow or spillage, particularly where road salt and water may become trapped beneath the carpet causing the floor of the automobile to rot or rust.

DISCLOSURE OF THE INVENTION

The present invention comprises a duplex floor mat having an porous mat supported above a reservoir to permit water and road salt to flow through the porous mat into the reservoir. The porous mat is supported over the reservoir to bear the weight of an operator's feet and to maintain separation of the porous mat from the contents of the reservoir. The water and dirt may be trapped in the reservoir until the water is evaporated or removed. In a preferred embodiment of the present invention, a sponge inlay in the reservoir helps to reduce spillage while the vehicle is in motion. It will be appreciated that the removal of the water from the surface of the porous mat of the mat to the reservoir below adds significantly to the driver's comfort and, accordingly, to his safety.

In a further preferred embodiment of this invention, the reservoir is fitted with air intake ducts which enable hot air to be channelled from the vehicle heating system through the mat to evaporate water trapped in the reservoir. Should hot air not be available in a particular vehicle, water can be evaporated by means of electrical devices placed in the reservoir of the lower mat.

It will be appreciated that the upper porous mat may be made aesthetically pleasing for it can be constructed of fabrics or other materials woven, knitted or otherwise manufactured by conventional techniques in many patterns and colours. If the materials chosen for its manufacture are sufficiently porous it may be unnecessary to provide additional porosity in the mat. Otherwise, holes may be cut in the mat at regular intervals to permit runoff to flow into the reservoir beneath. Of course, baffles or guides may be provided to direct the flow to the holes and to prevent it from running over the sides.

The upper porous mat may have flaps extendinq beyond the dimensions of the lower reservoir to cover the floor in low clearance areas. In these embodiments the communication holes to the lower reservoir will be located in portions of the upper porous mat over the lower reservoir to establish communication therewith and the upper porous mat flaps extending beyond the lower reservoir will be adapted with guides to channel the water back to the communication holes thereby enabling water to flow to the lower reservoir. Thus the car mat may be fitted with flaps designed to fold neatly below the foot pedals.

The car mat of this invention is adapted for easily disassembly with four standard retainer clips which may be readily removed for cleaning or refastened after reassembly. In Summer, the reservoir portion can be stored and the porous mat portion can be used by itself in the same way as a conventional mat to protect carpets from wear. It will be appreciated that the parts of the mat may be replaced individually as they wear out.

The floor mat reservoir preferably has a perimeter ridge to retain water and a support means within its perimeter adapted to support said porous mat over said reservoir.

A combination of the preferred features provides a floor mat for a motor vehicle comprising an upper mat, a reservoir and an air duct in which the upper mat is located over said reservoir and has perforations to allow melting snow, water and road salt to pass downwardly into the reservoir and to permit warm air to pass upwardly through the mat and in which the reservoir is surrounded with a perimeter ridge to retain water and has plurality of pedestals within to support the upper mat thereon and has a sponge means to soak up water and in which the air duct is connectable to a heater vent of the motor vehicle to circulate warm air into the reservoir to evaporate water which air exhausts upwardly through perforations in the upper mat. The updraft of warm air through the mat provides a pleasing and drying air current beneath and about the operator's feet.

BRIEF DESCRIPTION OF THE DRAWINGS

FIG. 1 is a perspective view of the reservoir of the floor mat of this invention.

FIG. 2 is a longitudinal section view in perspective of the reservoir taken along line I—I of FIG. 1 which sectional view illustrates an air intake duct.

FIG. 3 is another longitudinal sectional side view of the reservoir taken along line II—II of FIG. 1 which shows a flap adapted to fit under the pedals.

FIG. 4 is a transverse sectional view of the reservoir taken along line III—III illustrating the air ducts in the flap.

FIG. 5 is a top view of the upper porous mat of the present invention.

FIG. 6 is a transverse sectional view of the upper porous mat taken along line IV—IV in FIG. 5.

FIG. 7 is a view of a duct of this invention.

MODES FOR CARRYING OUT INVENTION

FIGS. 1-4 illustrate the reservoir (2) of this invention which is adapted to lie under and to carry an upper porous mat (15), which is shown in FIGS. 5 and 6. As illustrated in FIG. 1, the reservoir (2) is adapted with a plurality of pedestals (4) spaced integrally within the reservoir (2) to provide a support means and of a height to maintain a sufficient space between the upper porous mat (15) and the floor of the reservoir (2).

The reservoir (2) has a first chamber designed to lie flat on the floor of the automobile in the front compartment under the feet of an operator. A second chamber (13) of the reservoir (2) which is hinged as shown in FIG. 3 to adapt to an incline of the automobile floor beneath the foot pedals. In this portion the pedestals (4) are shorter to provide more clearance under the pedals. In another embodiment the reservoir does not extend under the pedals but the upper porous mat does. In this embodiment, (not shown), the porous portion of the upper mat does not begin until it overlays the reservoir (2).

The first chamber of the reservoir is preferably $\frac{3}{8}''$ in thickness from the top edge of the perimeter ridge to the bottom of the underside and is made of vinyl or rubber. The inclined forward portion of the second chamber (13) is $\frac{1}{8}''$ in thickness except around the top edge where it is $\frac{1}{4}$ thick.

As shown in FIGS. 2 and 4, air intake ducts (6) may be situated centrally under the floor of the first chamber (13) of the reservoir (2). Each duct is preferably $4\frac{1}{2}''$ in width and $\frac{1}{4}''$ in depth and extends the full length of the inclined portion. As shown in FIG. 1, each duct (6) runs along the underside of first chamber (13) and exhausts into the main body of the reservoir (2).

There are four standard detachable retainer clips that fit into holes (3) which hold the upper porous mat (15) to the reservoir (2). Pedestals (4) are placed sufficiently far apart to maximize circulation of air while providing adequate support the upper porous mat (15). It is preferred that each pedestals be about $\frac{1}{4}''$ in height in the main body of reservoir (2) and about 1/16'' high on the incline portion (13).

A ridge (7) runs about the perimeter of the reservoir having a flat top surface (10) to assist in the support the upper porous mat and having a raised inner sidewall (5) to retain water.

As illustrated in FIG. 5, the upper porous mat (15) has holes (8) throughout its surface which communicate to the reservoir (2) below. Each hole (8) is preferably $\frac{3}{8}''$ in diameter and spaced sufficiently to allow water to flow as quickly as possible to the reservoir below.

Flaps (9) are designed to fold neatly under the foot pedals of the automobile without interference. Slots (14) are placed along the upper mat (15) on both sides under the flaps (9), to prevent the mat from bulging when placed against an inclined floor of an automobile.

Duct attachment (11) is adapted with a rectangular plug to fit into the duct vent (6) of the mat and a hose (17) adapted to fit into one of the air outlets provided in an automobile. The hose (17) is manufactured of a material which will retain its shape when bent into position. Thus the hose will remain in the automobile air duct to obtain a supply of air and avoid any interference with the foot pedals of the automobile.

Sponge (12) is placed within the reservoir (2) about the pedestals (4) to soak up excess water while allowing for airflow within the reservoir (2) over and about the sponge (12). It will be appreciated that the sponge can be installed in many ways to obtain its purpose. In the preferred embodiment illustrated in FIG. 1 the sponge is located along a central portion and along the edges of the reservoir so as not to impede the flow of air from the air ducts.

INDUSTRIAL APPLICABILITY

The floor mat of the present invention may be manufactured for use in automobiles or other motor vehicles.

What is claimed is:

1. A floor mat for a motor vehicle comprising:
   a perforated upper mat;
   a reservoir having a first chamber to underlie the feet of an operator and a second chamber to underlie the pedals of the motor vehicle,
      said first chamber having a floor and a perimeter ridge with a front wall, two side walls and a rear wall,
      said second chamber having a floor, two side walls and a front wall, a rear portion of the floor of the second chamber being joined along the top of the front wall of said first chamber to flex upwardly and forwardly of the first chamber and to drain into the first chamber;
   a plurality of first pedestals spaced apart on the floor of the first chamber and a plurality of second pedestals spaced apart on the floor of the second chamber to support the upper mat above the first and second chambers of the reservoir;
   an air duct extending beneath the floor of the second chamber and communicating with the first chamber through a port in the front wall of the first chamber, said air duct to be connected to a heater vent of the motor vehicle to supply warm air to the first chamber.

2. The floor mat of claim 1 in which the first chamber has a sponge disposed along the rear wall of the first chamber which extends centrally and forwardly from the rear wall across the floor of the first chamber.

* * * * *